United States Patent [19]

Deux et al.

[11] Patent Number: 4,771,594
[45] Date of Patent: Sep. 20, 1988

[54] MACHINE FOR HARVESTING FRUIT AND BERRIES AND THE LIKE, FROM FRUIT TREES AND BUSHES PLANTED IN A ROW

[75] Inventors: Alain Deux, Angers; Jean-Camille Merant, Doue La Fontaine, both of France

[73] Assignee: Braud, Société Anonyme, France

[21] Appl. No.: 109,627

[22] Filed: Oct. 16, 1987

[30] Foreign Application Priority Data

Oct. 27, 1986 [FR] France ............... 86 14878

[51] Int. Cl.⁴ .................................. A01D 46/28
[52] U.S. Cl. ..................... 56/330; 56/328.1
[58] Field of Search ............... 56/330, 328.1

[56] References Cited

U.S. PATENT DOCUMENTS

| | | | |
|---|---|---|---|
| 3,685,266 | 8/1972 | Mohn et al. | 56/330 |
| 3,705,072 | 11/1972 | Patzlaff | 56/330 |
| 3,774,381 | 11/1973 | Burton | 56/330 |
| 4,085,572 | 4/1978 | Bruiel | 56/330 |
| 4,370,847 | 2/1983 | Arnaud | 56/330 |
| 4,538,406 | 9/1985 | Littau | 56/328.1 |

FOREIGN PATENT DOCUMENTS

2298929 10/1976 France ............... 56/330

Primary Examiner—Paul J. Hirsch

[57] ABSTRACT

In order to enable the shaker members (11) of this harvesting machine to adapt to the thickness of the vegetation on fruit trees and bushes, each shaker member has both ends attached to a support (14) which reciprocates transversely relative to the longitudinal mid axis (12) of the machine, and is constituted by a rod (11) made of a highly flexible material suitable for being curved into an arcuate shape with the convex side of the arc being directed towards the longitudinal mid axis (12). At least one end of each flexible rod (11) is attached to its support (14) at a point (19) which is capable of moving a certain distance in a direction which is substantially parallel to said longitudinal mid axis.

9 Claims, 5 Drawing Sheets

FIG_3

FIG_4

MACHINE FOR HARVESTING FRUIT AND BERRIES AND THE LIKE, FROM FRUIT TREES AND BUSHES PLANTED IN A ROW

FIELD OF THE INVENTION

The present invention relates to a machine for harvesting fruit and berries and the like, from fruit trees and bushes planted in rows, the machine comprising a straddling chassis which is movable across the fields, together with at least one shaker assembly including two substantially vertical and longitudinal supports which are spaced apart transversely from each other and which are situated on respective sides of the longitudinal mid axis of the machine, each of the two supports being movably mounted relative to the chassis and carrying a set of elongated shaker members which are spaced apart vertically and which extend generally horizontally in the direction of said longitudinal mid axis, each shaker member being constituted by a rod having both ends attached to one of the two supports and being shaped in such a manner that, going rearwardly from the front of the machine and together with the rods attached to the other support, it defines a converging inlet, an active shaker zone, and a diverging outlet for fruit trees and bushes, the shaker assembly further including a control mechanism connected to said supports in order to drive them with a synchronous reciprocating motion in a transverse direction relative to said longitudinal mid axis.

The invention relates particularly, but not exclusively, to harvesting grapes, and it is described in greater detail with reference to this type of harvesting, even though the machine of the present invention is also capable of being used for harvesting other fruits and berries, for example black currants, gooseberries, raspberries, or coffee grains.

BACKGROUND OF THE INVENTION

Most prior grape-picking machines use practically the same principle for harvesting grapes. This is to beat or shake the vine by imparting sinusoidal or pseudo-sinusoidal motion thereto at an amplitude and at a frequency suitable for causing the grapes or the bunches of grapes to become detached. This motion is communicated to the vine via shaker or beater members, disposed in such a manner as to act either on the vinestock or stem or else on the vegetation, i.e. on the fruit-bearing portion of the vine, depending on the type and number of shaker or beater members used. The percentage of bunches and/or individal grapes which are detached from the vine depends on the number and the amplitude of the oscillations to which a given bunch of grapes is subjected. The more energetic the shaking to which a given bunch of grapes is subjected, and the more frequently it is shaken, the more likely said bunch or its individual grapes is/are to become detached from the vine. The number and the amplitude of the oscillations to which a given bunch of grapes is subjected depend on various parameters that may be selected, in particular on the amplitude and the frequency of the control mechanism associated with the shaker or beater members, on the length of the active zone of said shaker or beater members, on the stiffness or the flexibility thereof, and on the speed at which the machine advances, together with other factors which are imposed by the vine itself, in particular the way it is trained, its shape, and the resistance it gives to the motions of the beater or shaker members. In any event, in order to obtain a high percentage of harvested individual grapes or bunches of grapes, it is important for all of the bunches of grapes at all levels on the vegetation to be properly subjected to the action of the shaker members.

In prior art picking machines of the above-indicated type (French Patent Nos. 2 516 742 and 2 522 246), each beater in each of two sets of beaters is constituted by a metal rod of the piano wire type, with both ends of the rods being fixed rigidly to one of two vertical and longitudinal supports in the form of a frame, and with each support frame being hinged to the chassis of the machine about a vertical axis which is situated close to one of its ends (French Patent No. 2 516 742) or else which is movably mounted on the chassis by means for maintaining the two support frames permanently in mutually parallel positions as they perform oscillating motion (French Patent No. 2 522 246). However, although the beaters are intended to be made of piano wire, their capabilities in elastic deformation and consequently their capabilities in adapting to variations in thickness of vine vegetation or in the machine being misaligned relative to a row or vines are relatively poor. This is so much the case that in French Patent No. 2 516 742 provision is made for each support frame to be fixed via its associated control mechanism to the bottom end of a vertical arm whose top end is hinged to the chassis of the machine about both a horizontal axis and a longitudinal axis. Each arm is returned to a vertical position by the combined effect of a mass and a spring. With such an assembly, in addition to their reciprocating transverse motion under the action of the control mechanism, both support frames and both associated sets of beaters move away from each other and towards each other automatically as a function of varying thickness of vine vegetation as the machine moves along a row of vines. However this adaptation of the gap between the two sets of beaters to the variation in the thickness of the vegetation is performed simultaneously by all of the beaters in each set. Consequently, when the beaters pass a vine plant whose vegetation varies considerably in thickness in the vertical direction, the gap between the two sets of beaters adjusts automatically to the thickest portion of the vegetation of the vine plant. As a result, the beaters level with the thinner portions of the vegetation have little or no effect on these portions of the vegetation and only a small quantity of the grapes thereon are harvested, if any.

The main object of the present invention is therefore to provide a harvesting machine of the above-indicated type in which the rod-shaped shaker members are capable of adapting individually to variations in the thickness of the vegetation of fruit trees and bushes so that the shaking is effective at all levels of the vegetation.

SUMMARY OF THE INVENTION

To this end the harvesting machine of the present invention includes the improvements whereby the rods are made of a material having a high degree of flexibility and are curved to form arcs whose convex sides face towards the longitudinal mid axis of the machine, and whereby at least one of the ends of each flexible rod is attached to the corresponding support at a point which is movable to a certain extent in a direction which is substantially parallel to said longitudinal mid axis.

In one possible embodiment of the present invention each flexible rod has one of its ends fixed rigidly or hinged to a fixed point of the corresponding support and has its other end attached to a moving point which moves in a direction substantially parallel to the longitudinal mid axis of the machine. In another possible embodiment each flexible rod has both of its ends attached to points which are movable in a direction substantially parallel to said longitudinal mid axis.

Because of the high flexibility of the rods and because of their arcuate shape, and given that the ends of each flexible rod are attached either to one point which is fixed and to one point which is movable in a longitudinal direction, or else to two points both of which are movable in said longitudinal direction, each rod can nevertheless adapt elastically and individually to the variations in thickness of the vegetation of the fruit trees and bushes by bending. Consequently, all of the rods act with the same efficiency at all levels up the vegetation for the purpose of detaching fruit, even if a given tree or bush has vegetation that varies in thickness to a large extent in the vertical direction. Compared with prior picking machines, in which the beaters are constituted by metal rods having both ends fixed rigidly to oscillating support frames (French Patent Nos. 2 516 742 and 2 522 246), the flexible rods of a harvesting machine in accordance with the present invention each have a much greater capability of individually adapting to variations in thickness of the vegetation, and at all levels of the vegetation, thus providing greater efficiency in harvesting fruit.

BRIEF DESCRIPTION OF THE DRAWINGS

Other features and advantages of the invention appear from the following description of various embodiments, given by way of example with reference to the accompanying drawings, in which.

MORE DETAILED DESCRIPTION

Figure 1:
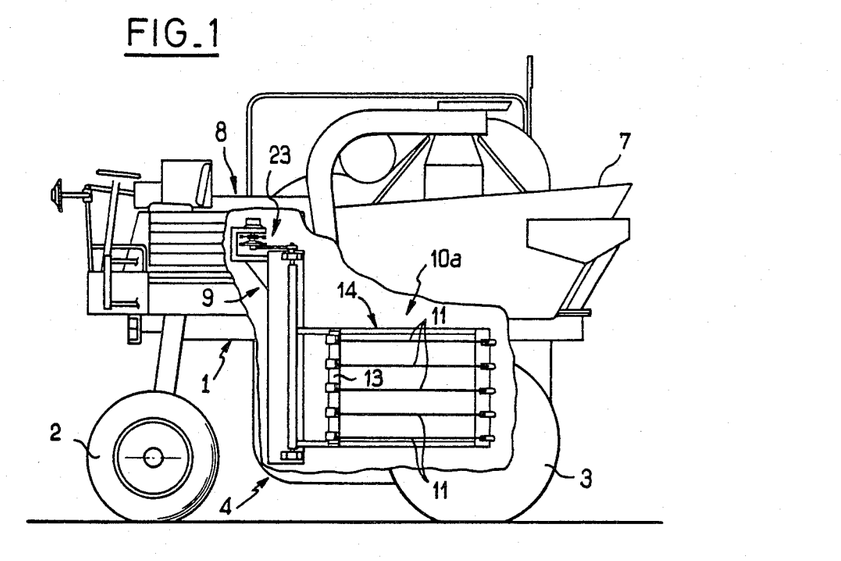
FIG. 1 is a partially broken side elevation view of a harvesting machine fitted with a shaker assembly in accordance with the present invention.
Figure 2:
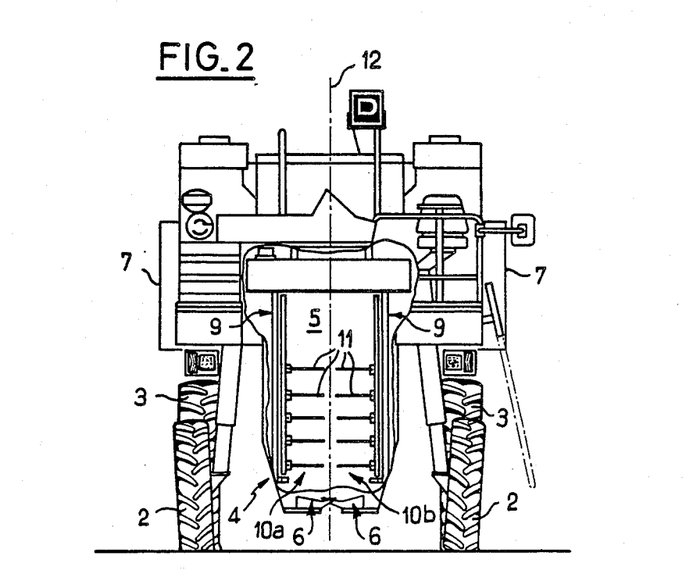
FIG. 2 is a partially broken front elevation view of the FIG. 1 harvesting machine.

The harvesting machine shown in FIGS. 1 and 2 comprises, in conventional manner, a chassis 1 provided with front wheels 2 and rear wheels 3 for moving on the ground, and which is in the form of a gantry in order to be able to straddle a row of plants. The chassis 1 carries, in known manner, a harvesting assembly 4 comprising a shaker assembly 5 and two elevator-conveyors 6 for collecting the grapes that have been detached by the shaker assembly in order to convey them to a temporary storage tank 7 (generally two tanks are provided on respective sides of the machine), and it also has a motor 8 providing the power necessary for driving the various active members of the machine and also for driving its wheels if the machine is a self-propelled machine.

The harvesting assembly 4 may be fixed permanently to the chassis 1 of the machine or else it may be made in the form of a removable assembly which is detachably fixed to the chassis 1 so as to be capable of being replaced by other equipment or accessories, such as spraying equipment, pruning equipment, equipment for tilling the ground, etc. The harvesting assembly 4 can therefore either be supported directly by the chassis 1 of the machine or else it may be supported by an auxiliary chassis 9. In known manner, the auxiliary chassis 9 may be fixed relative to the chassis 1 or it may be rockably mounted thereon with its top portion being free to rock about a horizontal and longitudinal axis.

As can be seen more particularly in FIG. 2, the shaker assembly (to which the invention applies more particularly) comprises two sets 10a and 10b of shaker members 11, with the two sets 10a and 10b being disposed facing one another on opposite sides of the central longitudinal plane 12 of the machine. As can be seen more clearly in FIG. 4, each set, e.g. the set 10a, may comprise five shaker members 11, for example, which are vertically spaced one above the other and which extend generally horizontally, even though they may also slope downwardly going from the front towards the rear of the machine. Although the shaker assembly shown in FIGS. 1 to 5 comprises two sets of six shaker members, it is obvious that the invention is not limited to that number of shaker members, but that the number may be decreased or increased depending on types of fruit tree or bush, and for a given type of fruit tree or bush depending on the variety, the way in which it has been trained, and the shape of the vegetation of the fruit trees or bushes, variations may also depend on whether it is desired to shake the fruit trees or bushes by their trunks or by their vegetation.

Each shaker member 11 is constituted by a rod whose cross-section is very small compared with its length, and which is made of a material which is very flexible and deformable, for example a polyamide or a glass fiber reinforced polyester. Good results have been obtained on vines when using rods having a circular section with a diameter of 25 mm and a length of 2 meters (m) made of a type 6 polyamide whose modulus of elasticity E is equal to 3000 N/mm$^2$.

Figure 3:
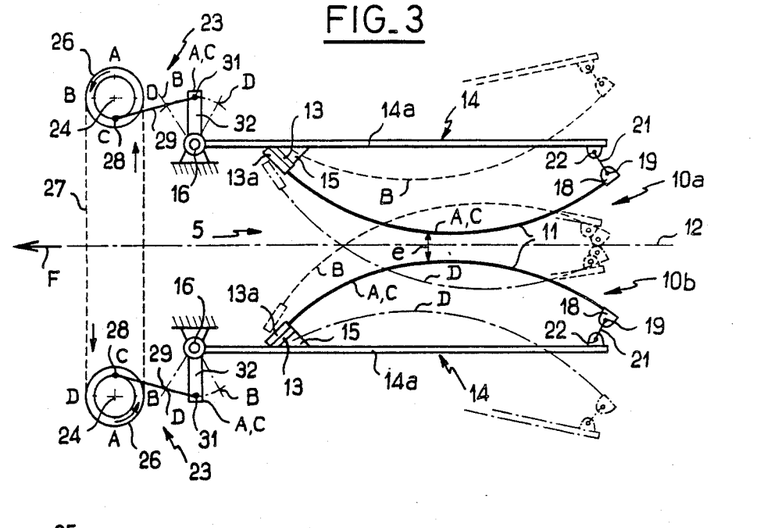
FIG. 3 is a schematic top view on a larger scale of the shaker assembly of the machine of FIGS. 1 and 2.
Figure 5:
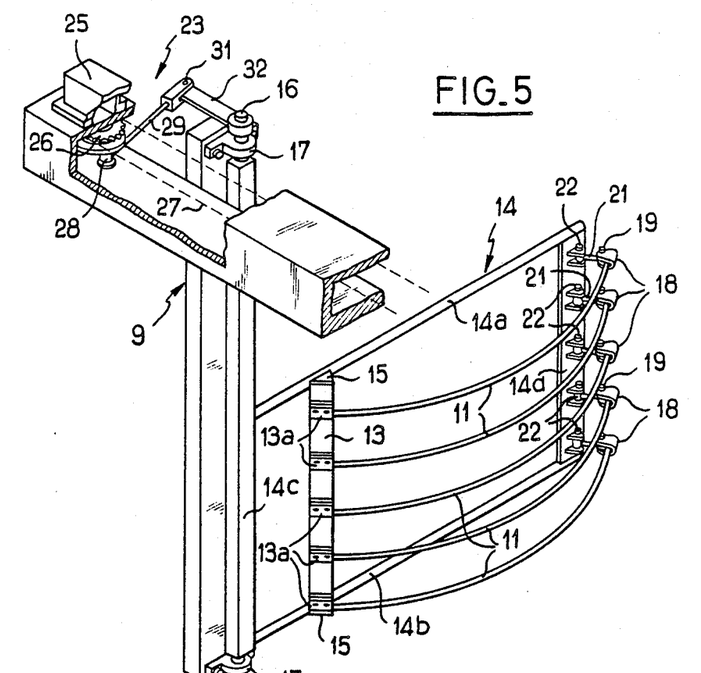
FIG. 5 is a perspective view of a portion of the shaker assembly shown in FIG. 4.

As can be seen more particularly in FIGS. 3 and 5, each rod 11 is curved to form an arc. The rods used may be pre-curved on manufacture or they may be rectilinear, in which case they are curved by bending when mounted on the shaking assembly 5.

Figure 4:
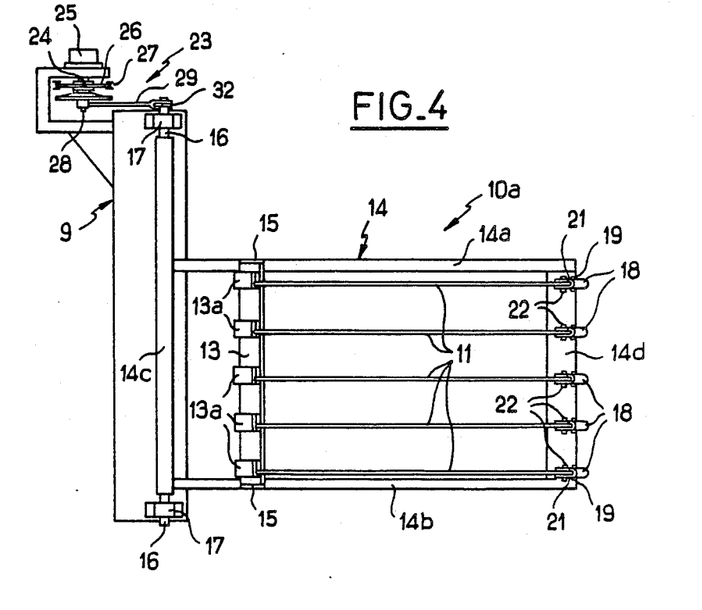
FIG. 4 is a side elevation view showing a portion of the shaker assembly of the machine of FIGS. 1 and 2.

As can be seen more particularly in FIGS. 3 to 5, one of the ends of each rod 11 is firmly clamped in a clamp 13a which is rigidly fixed to a vertical support plate 13 (with one plate 13 being provided for each of the two sets 10a and 10b of rods 11). Each plate 13 is fixed rigidly at its ends to the horizontal sides 14a and 14b of a rectangular support frame 14 (with one frame 14 being provided for each of the two sets 10a and 10b). More precisely, each end of each plate 13 is fixed, e.g. by welding, to a support part 15 which is triangular in shape and which is itself fixed, e.g. by welding, to the side 14a or 14b of the frame 14 in such a manner that the plate 13 takes up a predetermined angle, e.g. about 45°, with the plane of the frame 14 as can be seen in FIG. 3.

The vertical side 14c of each frame 14 is provided, at each of its ends, with a vertical axis stub axle 16 rotatably received in a bearing 17 fixed to the auxiliary chassis 9. The other end of each rod 11 is fixed on a support 18 which is hinged about a vertical axis 19 to one of the ends of a short link 21 which extends generally transversely relative to the longitudinal mid axis 12 and whose opposite end is hinged about a vertical axis 22 to the other vertical side 14d of the frame 14.

Two reciprocating motion drive devices 23 are connected to the support frames 14 respectively in order to make them oscillate about the axes of their respective stub axles 16. Each of the two drive devices 23 may be constituted, for example, by a connecting rod and crank system having a vertical axis shaft 24 which is rotatably mounted in a bearing 25 (FIGS. 4 and 5) fixed to the auxiliary chassis 9. One of the two shafts 24 may be rotated by an appropriate transmission (not shown) connected to the outlet shaft of a motor, e.g. the motor 8 of the harvesting machine. The two shafts 24 rotate in the same direction, and their rotation is synchronized by a transmission constituted by two pulleys 26 fixed to respective ones of the shafts 24 together with an endless chain 27. Each of the connecting rod and crank systems 23 has a crank pin 28 hinged to one of the ends of a connecting rod 29 whose other end is hinged about an axis 31 to a horizontal arm 32. One of the two arms 32 is rigidly fixed to the top stub axle 16 of the frame 14 supporting the set 10a of rods 11, whereas the other arm 32 is rigidly fixed to the top stub axle 16 of the frame 14 supporting the other set 10b of rods 11. As shown in FIG. 3, the crank pins 28 of the two connecting rod and crank systems 23 occupy angular positions relative to their respective shafts 24 which are offset by 180°.

Preferably, each of the two connecting rods 29 is in the form of a rod whose length is adjustable in known manner in order to make it possible to adjust the gap e between the flexible rods 11 of the two sets 10a and 10b.

In the following description, it is assumed that the harvesting machine advances in the direction indicated by arrow F in FIG. 3. Under such conditions, the support plates 13 are at the front ends of the rods 11, whereas the supports 18 and the links 21 are at the rear ends of the rods 11. Under these conditions, going from the front to the rear of the machine, the arcuate shape of the flexible rods 11 in the two sets 10a and 10b form, between said sets, a converging inlet zone for fruit trees and bushes, followed by an active shaking zone (occupying the intermediate region of the rods 11), which is in turn followed by a diverging outlet zone for the fruit trees or bushes.

In FIG. 3, letters A, B, C, and D indicate the positions taken up by the various components of the shaker assembly 5 for four different angular positions A, B, C, and D of the connecting rod and crank drive system 23. From FIG. 3, it is clear that during rotation of the crank pins 28 about the axes of the shafts 24, the frame 14 supporting the set 10a of rods 11 move towards the longitudinal mid axis 12 when the frame 14 supporting the set 10b of rods 11 moves away from said axis vice-versa, such that the active shaking zone in the intermediate region of the rods 11 reciprocates transversely on either side of said longitudinal axis 12. The amplitude of the transverse motion of the active portion of the flexible rods 11 depends on the eccentricity of the crank pins 28 relative to the axes of the shafts 24. Preferably, the eccentricity of the crank pins 28 is adjustable in known manner in order to make it possible to adjust the amplitude of the transverse motion of the active portion of the flexible rods 11. Preferably, as already mentioned above, the two connecting rods 29 are also provided in the form of adjustable length rods in order to make it possible to adjust the average position (positions A, C) of the rods 11 so that in this position the active portions of the rods in the two sets 10a and 10b respectively are disposed symmetrically about the longitudinal mid axis 12.

Figure 6:
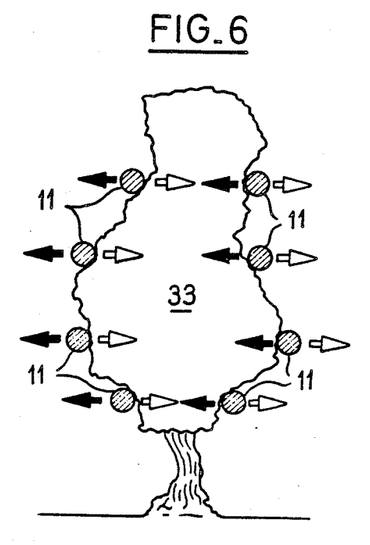
FIG. 6 shows how the flexible rods of the shaker assembly act on a fruit tree or bush, such as a vine plant.

FIG. 6 shows how the flexible rods 11 of the shaker assembly 5 of a harvesting machine in accordance with the present invention are capable of adapting individually to the thickness of vegetation 33 on a fruit tree or bush such as a vine plant. This may be explained as follows. When a vine plant arrives in the converging inlet between the two sets of 10a and 10b of rods 11, the vegetation applies forces to the rods 11 which, by virtue of their great flexibility, deform elastically and individually by bending in the region of the clamps 13a and they moved to a greater or lesser extent away from the longitudinal mid axis 12 depending on the thickness of the vegetation level with each rod 11. This bending deformation is additionally facilitates by the presence of the links 21 which are capable of pivoting rearwardly about their axes 22, thereby enabling the rods 11 to "lengthen" rearwardly (so that their average curvature reduces). In other words, the rear ends of the rods 11 are movable in a direction substantially parallel to the longitudinal mid axis 12 and through the distance permitted by the links 21 pivoting about their axes 22.

Figure 7:
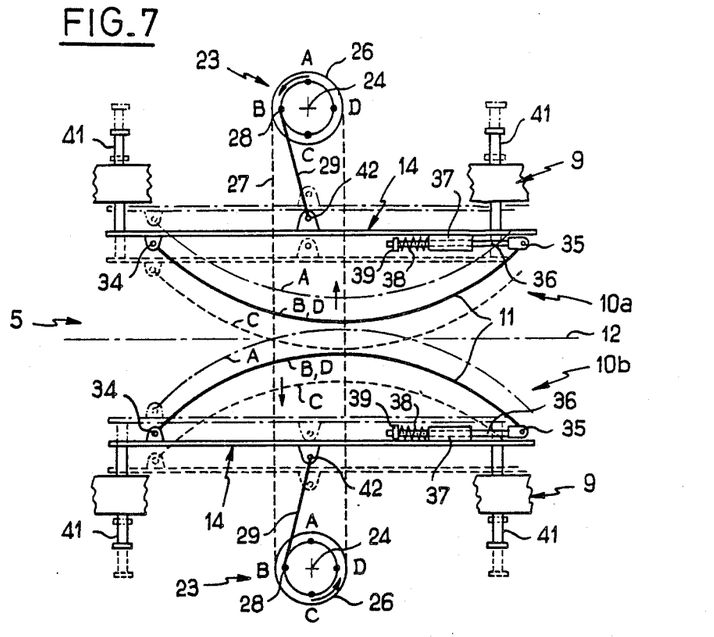
FIG. 7 is a view similar to FIG. 3 showing a second embodiment of the shaker assembly.
Figure 8:
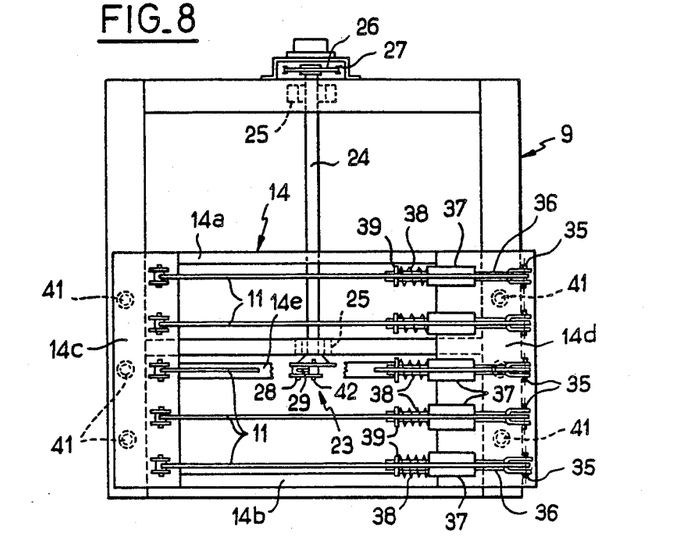
FIG. 8 is a side elevation view of a portion of the FIG. 7 shaker assembly.

FIGS. 7 and 8 show another embodiment of the shaker assembly 5 in which means which are identical or which perform the same function as means in the shaker assembly of FIGS. 1 to 5 are designated by the same reference numerals and are not described in greater detail below. In FIGS. 7 and 8, each flexible rod 11 has one of its ends hinged about a vertical axis 34 to the support frame 14 and has its opposite end hinged about a vertical axis 35 to one of the ends of a horizontal cylindrical rod 36 which extends generally parallel to the longitudinal mid axis 12 and which is slidably mounted in a cylindrical sleeve 37 fixed to the frame 14.

If the rods 11 are curved by bending when assembled in the shaker assembly 5, a resilient member such as a helical spring 38 is associated with each sliding rod 36 in order to maintain the corresponding rod 11 in the bent state with the desired initial curvature. Each spring 38 is concentrically mounted about the sliding rod 36 between the sleeve 37 and an abutment 39 fixed to the sliding rod 36. The abutment 39 may advantageously be constituted by a nut screwed on a threaded portion of the sliding rod so that the force of the spring 38 can be adjusted, and thus making it possible to adjust the initial curvature of the flexible rod 11 connected to the sliding rod 36. Although the springs 38 are not essential in the event that the rods 11 are pre-curved on manufacture, it may nevertheless be advantageous, even if they are pre-curved, to provide springs 38 and nuts 39 in order to allow the curvature of the rods 11 to be adjusted.

Each of the two support frames 14 is mounted to move in translation relative to the auxiliary chassis 9 in a direction perpendicular to the longitudinal mid axis 12 by means of a plurality of parallel cylindrical rods 41 which are fixed at one end to the vertical side 14c or 14d of the frame 14 and which are slidably mounted in cylindrical sleeves (not shown) fixed to the auxiliary chassis 9.

Each support frame 14 is associated with a reciprocating motion drive device 23 for moving the said frame transversely relative to the longitudinal mid axis 12. Each drive device 23 may be constituted, for example, by a connecting rod and crank system whose connecting rod 29 is hinged about an axis 42 to a horizontal cross member 14e of the frame 14 (FIG. 8). The two connecting rods 29 are preferably made in the form of rods whose lengths are adjustable in order to make it possible to adjust the gap between the active portions of the rods 11 of the two sets 10a and 10b.

The crank pins 28 of the two connecting rod and crank drive systems 23 associated with the frames 14 are mounted at identical angular positions on their respective drive shafts 24. As in the embodiment of FIGS. 1 to 5, the two shafts 24 are coupled and caused to rotate synchronously by means of a transmission comprising an endless chain 27 and two chain wheels 26 fixed to respective ones of the shafts 24. One of the two shafts 24 may be rotated by an appropriate transmission (not shown) connected to the outlet shaft of the motor 8 of the harvesting machine, for example. Preferably, the eccentricity of each crank pin 28 relative to the corresponding shaft 24 is capable of being adjusted in known manner in order to make it possible to adjust the amplitude of the transverse motion of each frame 14.

The shaker assembly 5 of FIGS. 7 and 8 operates in substantially the same manner as the assembly of FIGS. 1 to 5. The facility given to each flexible rod 11 of adapting individually to the thickness of the vegetation by bending is due, in this case, not only to the high degree of flexibility of the rods 11, but also to the fact that the ends of the rods 11 are not rigidly fixed to the frame 14 but are higned about axes 34 and 35 and is also due to the fact that one end of each rod 11 (the end which is attached to the sliding rod 36) is movable over a certain distance in a direction parallel to the longitudinal mid axis 12.

Figure 9:
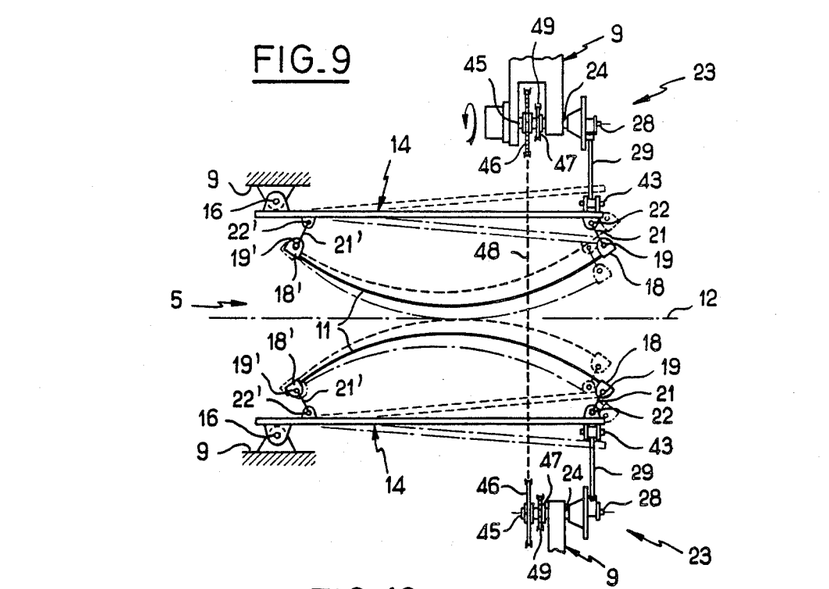
FIG. 9 is a view similar to FIGS. 3 and 7 showing a third embodiment of a shaker assembly.
Figure 10:
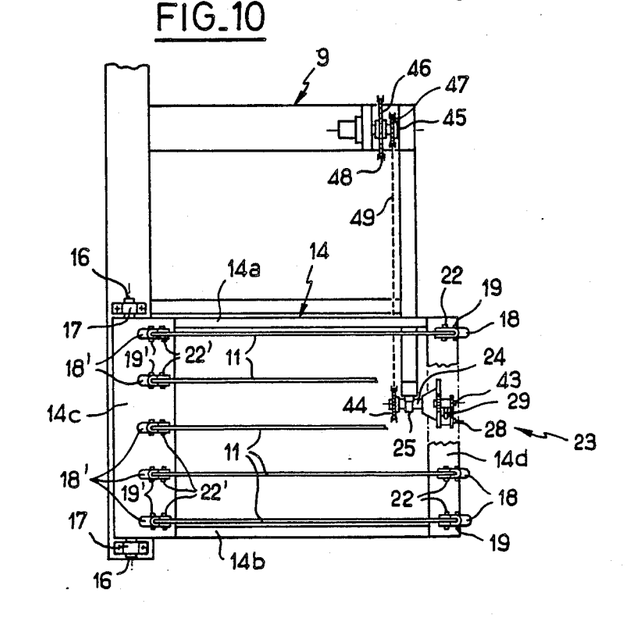
FIG. 10 is a side elevation view of a partion of the FIG. 9 shaker assembly.

FIGS. 9 and 10 show another embodiment of the shaker assembly 5, in which items which are identical or which perform the same function as items shown in FIGS. 1 to 5 are designated by the same reference numerals and are not described in greater detail below. The shaker assembly in FIGS. 9 and 10 differs from that of FIGS. 1 to 5 in that instead of being rigidly fixed to the support frame 14, the front end of each flexible rod 11 is connected to the frame 14 in the same way as its rear end is connected thereto. More precisely, the front end of each rod 11 is hinged about a vertical axis 19' to one of the ends of a short link 21' whose opposite end is hinged about a vertical axis 22' to the vertical side 14c of the frame 14. In this case, both ends of each rod 11 are movable in a direction substantially parallel to the longitudinal mid axis 12 through a distance determined by the links 21 and 21' pivoting about their respective axes 22 and 22'. In this way, and by virtue of their high degree of flexibility, the rods 11 are capable of deforming elastically by bending in order to adapt individually to the thickness of the vegetation level with each rod 11.

Although both frames 14 in the embodiment of FIGS. 9 and 10 may be driven in oscillating motion about the axes of their respective stub axles 16 by two connecting rod and crank systems 23 disposed in the same manner as that shown in FIGS. 3 to 5, FIGS. 9 and 10 show another way of connecting the connecting rod and crank systems 23 to the frames 14. In this case, the two shafts 24 extend horizontally and parallel to the longitudinal mid axis 12 and each of the two connecting rod and crank systems 23 is situated close to the rear vertical side 14d of a frame 14, with each connecting rod 29 being hinged about a horizontal axis 43 to the side 14d of the corresponding frame 14 close to the middle of said side. A chain wheel 44 is fixed on each shaft 24. Two other longitudinally extending horizontal shafts 45 are rotatably mounted in appropriate bearings fixed to the auxiliary chassis 9 and are situated above respective ones of the shafts 24. One of the two shafts 45 is rotated by a suitable transmission connected, for example, to the motor 8 of the machine. Each of the shafts 45 has two chain wheels 46 and 47 fixed thereto. A first endless chain 48 runs round the two chain wheels 46 in order to synchronize rotation of the two shafts 45. A second endless chain 49 passes round one of the two chain wheels 47 and around the chain wheel 44 situated vertically below the said chain wheel 47 in order to synchronize rotation of the two shafts 24 and 45 situated one above the other. Similarly a third endless chain 49 passes round the two chain wheels 44 and 47 in order to synchronize rotation of the two shafts 24 and 25 likewise situated one above the other. In this way, the shafts 24 are caused to rotate at the same speed and in the same direction. Further, in this case, in order to ensure that the two frames move together towards the left and towards the right of the machine, the crank pins 28 of the two connecting rod and crank systems 23 are fixed in identical angular positions relative to their respective shafts 24.

Naturally, the embodiments of the present invention that have been described above are given purely by way of non-limiting example, and numerous modifications may easily be provided thereto by the person skilled in the art without thereby going beyond the scope of the invention as defined in the following claims. Thus, in particular, instead of using connecting rod and crank systems as reciprocating motion drive devices, it would also be possible to use double acting hydraulic actuators. Further, although the present description has been described more particularly with reference to a self-propelled harvesting machine, it is clear that the invention is equally applicable to tractor-mounted harvesting machines.

We claim:

1. A machine for harvesting fruit and berries and the like, from fruit trees and bushes planted in rows, the machine comprising a straddling chassis which is movable across the fields, together with at least one shaker assembly including two substantially vertical and longitudinal supports which are spaced apart transversely from each other and which are situated on respective sides of the longitudinal mid axis of the machine, each of the two supports being movably mounted relative to the chassis and carrying a set of elongated shaker members which are spaced apart vertically and which extend generally horizontally in the direction of said longitudinal mid axis, each shaker member being constituted by a rod having both ends attached to one of the two supports and being shaped in such a manner that, going rearwardly from the front of the machine and together with the rods attached to the other support, it defines a converging inlet, an active shaker zone, and a diverging outlet for fruit trees and bushes, the shaker assembly further including a control mechanism connected to said supports in order to drive them with a synchronous reciprocating motion in a transverse direction relative to said longitudinal mid axis, the machine including the improvements whereby the rods are made of a material having a high degree of flexibility and are curved to form arcs whose convex sides face towards the longitudinal mid axis of the machine, and whereby at least one of the ends of each flexible rod is attached to the corresponding support at a point which is movable to a certain extent in a direction which is substantially parallel to said longitudinal mid axis.

2. A machine according to claim 1, wherein each flexible rod has one of its ends fixed rigidly to said support and has its opposite end higned about a first vertical axis to one of the ends of a short horizontal link which extends generally transversely relative to the longitudinal mid axis and whose opposite end is hinged about a second vertical axis to the support.

3. A machine according to claim 1, wherein each flexible rod has both ends connected via short links to said support, each of the two links being hinged to the rod about a first vertical axis and to the support about a second vertical axis.

4. A machine according to claim 1, wherein each flexible rod has one of its ends which is hinged about a first vertical axis to said support and which has its opposite end hinged about a second vertical axis to one of the ends of a horizontal cylindrical rod which extends generally parallel to the longitudinal mid axis and which is slidably mounted in a cylindrical sleeve fixed to said support.

5. A machine according to claim 4, wherein each sliding rod has a resilient member associated therewith acting on said sliding rod in a direction tending to cause the flexible rod attached to the sliding rod to be maintained in the bent state with an arcuate shape.

6. A machine according to claim 5, wherein said resilient member is constituted by a helical spring which is concentrically mounted around the sliding rod between the cylindrical sleeve and an abutment fixed to the sliding rod.

7. A machine according to claim 6, wherein the abutment is constituted by a nut which is screwed on a threaded portion of the sliding rod.

8. A machine according to claim 1, wherein the flexible rods are about 2 meters long and have a circular cross-section with a diameter of about 25 mm.

9. A machine according to claim 1, wherein the flexible rods are made of a polyamide having a modulus of elasticity of about 3000 N/mm$^2$.

* * * * *